US012686570B2

(12) United States Patent
Fenn

(10) Patent No.: US 12,686,570 B2
(45) Date of Patent: Jul. 21, 2026

(54) LOAD-CENTERING APPARATUS INCLUDING A TORQUE-ABSORBING COUPLER

(71) Applicant: Signode Industrial Group LLC, Tampa, FL (US)

(72) Inventor: Carsten Fenn, Sonderborg (DK)

(73) Assignee: Signode Industrial Group LLC, Tampa, FL (US)

( * ) Notice: Subject to any disclaimer, the term of this patent is extended or adjusted under 35 U.S.C. 154(b) by 192 days.

(21) Appl. No.: 18/570,492

(22) PCT Filed: May 12, 2022

(86) PCT No.: PCT/US2022/072280
§ 371 (c)(1),
(2) Date: Dec. 14, 2023

(87) PCT Pub. No.: WO2022/272199
PCT Pub. Date: Dec. 29, 2022

(65) Prior Publication Data
US 2024/0279000 A1 Aug. 22, 2024

Related U.S. Application Data

(60) Provisional application No. 63/214,870, filed on Jun. 25, 2021.

(51) Int. Cl.
B65G 47/22 (2006.01)
(52) U.S. Cl.
CPC .......... B65G 47/22 (2013.01); *B65G 2207/28* (2013.01)

(58) Field of Classification Search
None
See application file for complete search history.

(56) References Cited

U.S. PATENT DOCUMENTS

| | | | | |
|---|---|---|---|---|
| 4,023,689 | A | * 5/1977 | Taylor | E01C 19/203 |
| | | | | 251/75 |
| 6,286,659 | B1 | 9/2001 | Petrovic | |
| 10,569,914 | B2 | 2/2020 | Foy et al. | |
| 12,264,494 | B2 * | 4/2025 | Sugahara | B66B 9/02 |
| 2007/0037644 | A1 | 2/2007 | Mevissen et al. | |
| 2013/0276415 | A1 | 10/2013 | Haberstroh et al. | |
| 2017/0015450 | A1 | 1/2017 | Huber et al. | |

FOREIGN PATENT DOCUMENTS

| | | | |
|---|---|---|---|
| CN | 106743407 A | 5/2017 | |
| CN | 110316546 A | * 10/2019 | B65G 47/24 |
| CN | 112110149 A | 12/2020 | |
| EP | 0703146 A1 | 3/1996 | |
| EP | 1151921 A2 | 11/2001 | |
| JP | 2010043651 A | 2/2010 | |
| WO | 9822348 A1 | 5/1998 | |
| WO | 2009055176 A1 | 4/2009 | |
| WO | 2012094225 A1 | 7/2012 | |

OTHER PUBLICATIONS

"International Search Report and Written Opinion", from corresponding PCT/US2022/072280, Sep. 14, 2022.

* cited by examiner

*Primary Examiner* — Kavel Singh
(74) *Attorney, Agent, or Firm* — Neal, Gerber & Eisenberg LLP

(57) ABSTRACT

A load-centering apparatus including a torque-absorbing coupler that minimizes the likelihood that the load-centering apparatus will damage a load of goods after centering the load of goods on a conveyor.

20 Claims, 9 Drawing Sheets

LOAD-CENTERING APPARATUS INCLUDING A TORQUE-ABSORBING COUPLER

PRIORITY

This application is a national phase application of PCT/US2022/072280, filed on May 12, 2022, which claims priority to and the benefit of U.S. Provisional Patent Application No. 63/214,870, filed Jun. 25, 2021, the entire contents of which is incorporated herein by reference.

FIELD

The present disclosure relates to a load-centering apparatus for centering loads on a conveyor, and more particularly to a load-centering apparatus including a torque-absorbing coupler.

BACKGROUND

Load-centering apparatuses are employed for centering loads of goods on a conveyor. Generally, a load-centering apparatus includes two opposing centering arms and a motor that controls the centering arms to move laterally inward (relative to the direction of travel of the load of goods) toward one another at the same rate so they engage opposing sides of a load of goods and center the load of goods on the conveyor. Some of these conveyors are infeed conveyors that deliver the loads of goods to a packaging machine, such as a stretch-hood machine that wraps the loads of goods with tubular plastic stretch film. Centering the loads of goods on the infeed conveyor before delivering the loads of goods to the packaging machine ensures the loads of goods are properly positioned for packaging.

Certain load-centering apparatuses use an electric motor to control the two centering arms. In these load-centering apparatuses, during the load-centering process the motor attempts to move the centering arms laterally inward until the motor stalls, at which point the load of goods is centered and the motor moves the centering arms back outward to release the load of goods. A problem with this setup is that the motor stalls after the load of goods has been centered and after the centering arms have continued to apply force to opposing sides of the load of goods—in essence, squeezing it—which leads to the motor stall since the load prevents the motor from continuing to move the centering arms. This squeezing action after centering and before the motor stall could damage or even destroy the load of goods and/or the motor.

SUMMARY

Various embodiments of the present disclosure provide a load-centering apparatus including a torque-absorbing coupler that minimizes the likelihood that the load-centering apparatus will damage a load of goods after centering the load of goods on a conveyor.

DETAILED DESCRIPTION

Figure 1:
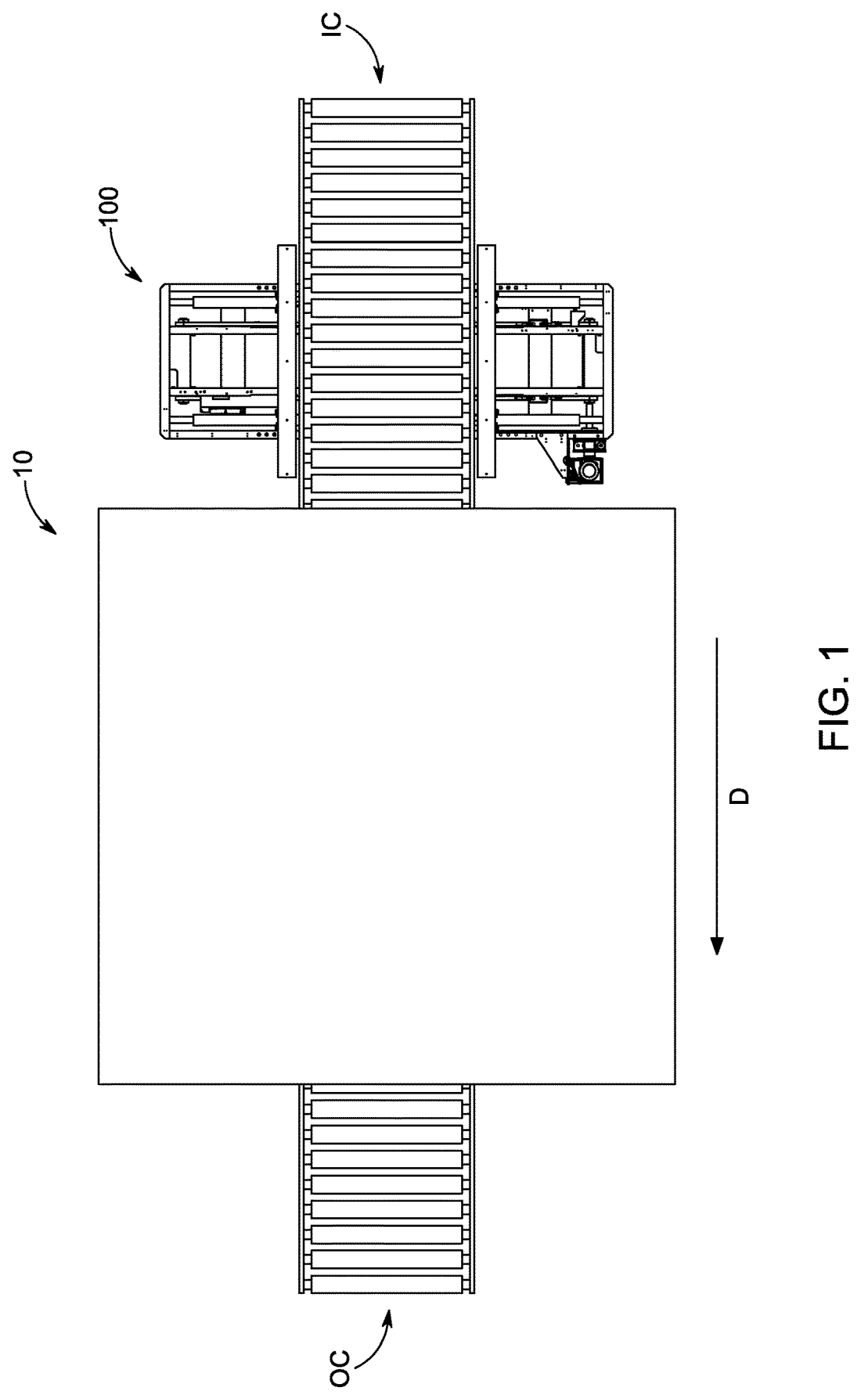
FIG. 1 is a top plan view of the stretch-hood machine of FIG. 2, infeed and outfeed conveyors for the stretch-hood machine, and one example embodiment of the load-centering apparatus of the present disclosure.

While the systems, devices, and methods described herein may be embodied in various forms, the drawings show and the specification describes certain exemplary and non-limiting embodiments. Not all of the components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as mounted, connected, etc., are not intended to be limited to direct mounting methods but should be interpreted broadly to include indirect and operably mounted, connected, and like mounting methods. This specification is intended to be taken as a whole and interpreted in accordance with the principles of the present disclosure and as understood by one of ordinary skill in the art.

Various embodiments of the present disclosure provide a load-centering apparatus including a torque-absorbing coupler that minimizes the likelihood that the load-centering apparatus will damage a load of goods after centering the load of goods on a conveyor. While the load-centering apparatus is shown for use with an infeed conveyor for a stretch-hood machine herein, the load-centering apparatus of the present disclosure can be used in other manners, for other purposes, and for other machines or systems.

FIG. 1 shows part of an integrated packaging line including a stretch-hood machine 10, a driven infeed conveyor IC, a driven outfeed conveyor OC, and one example embodiment of the load-centering apparatus 100 of the present disclosure.

Figure 2:
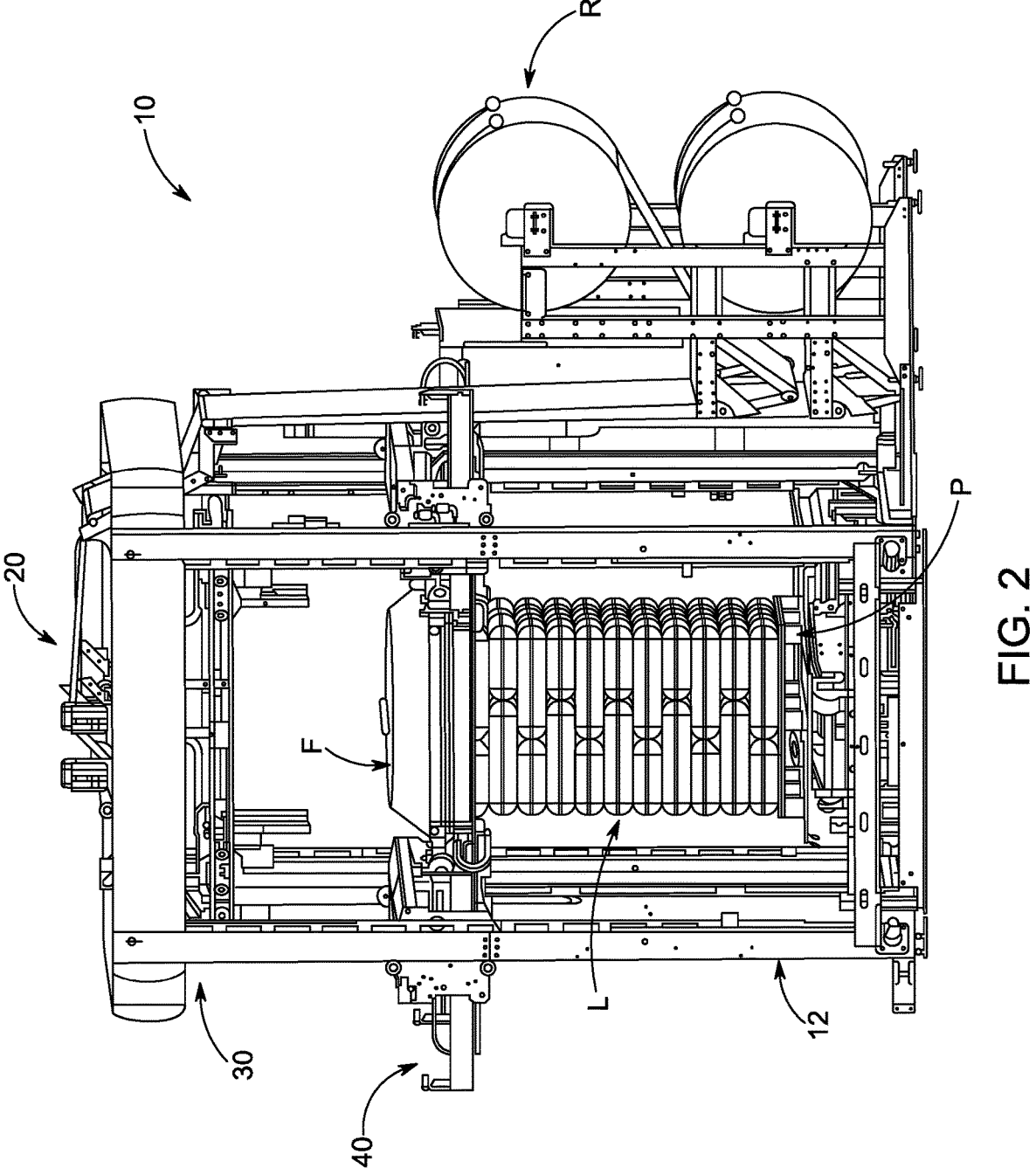
FIG. 2 is a perspective view of one example embodiment of a stretch-hood machine.
Figure 3:
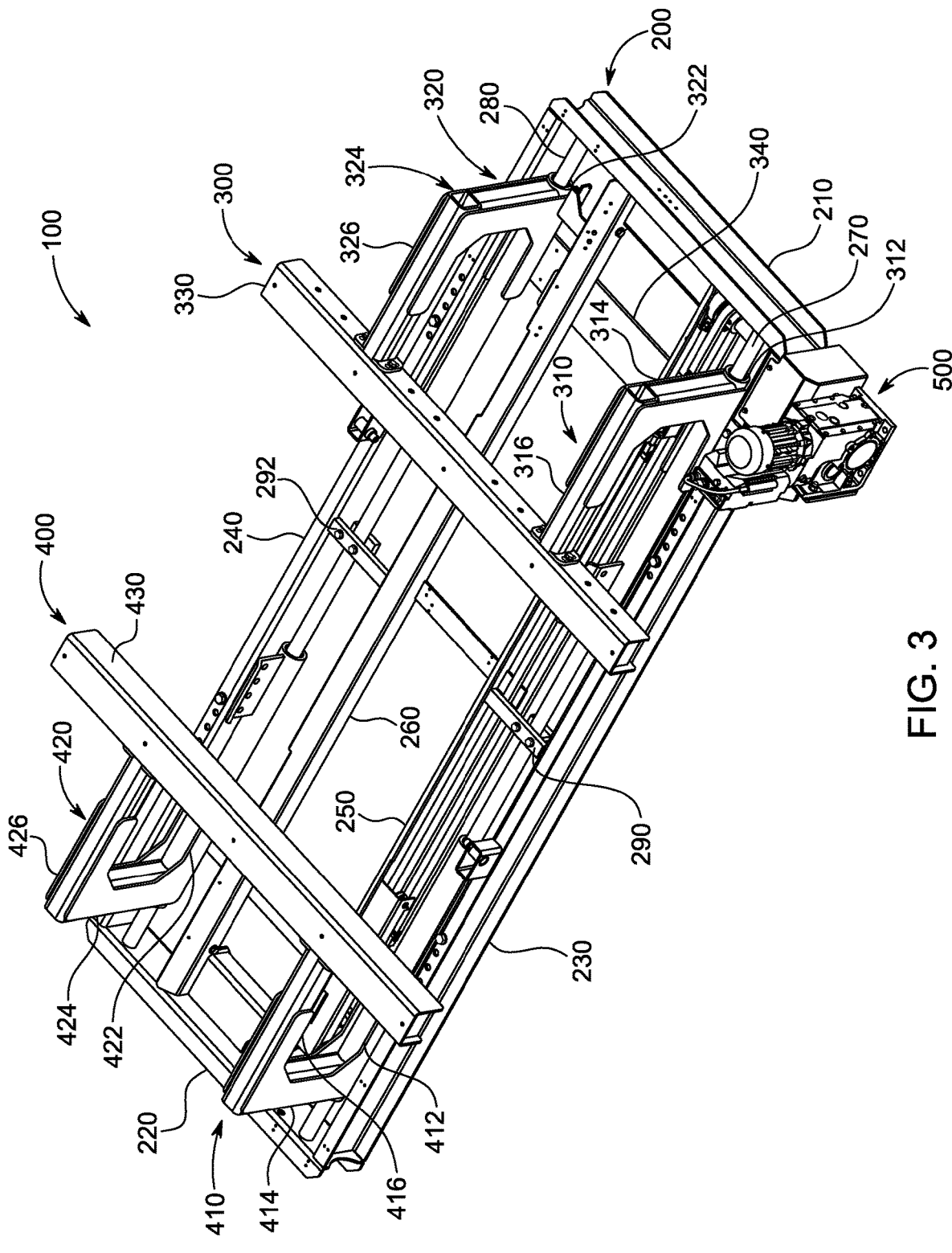
FIG. 3 is a top perspective view of the load-centering apparatus of FIG. 1.
Figure 4:
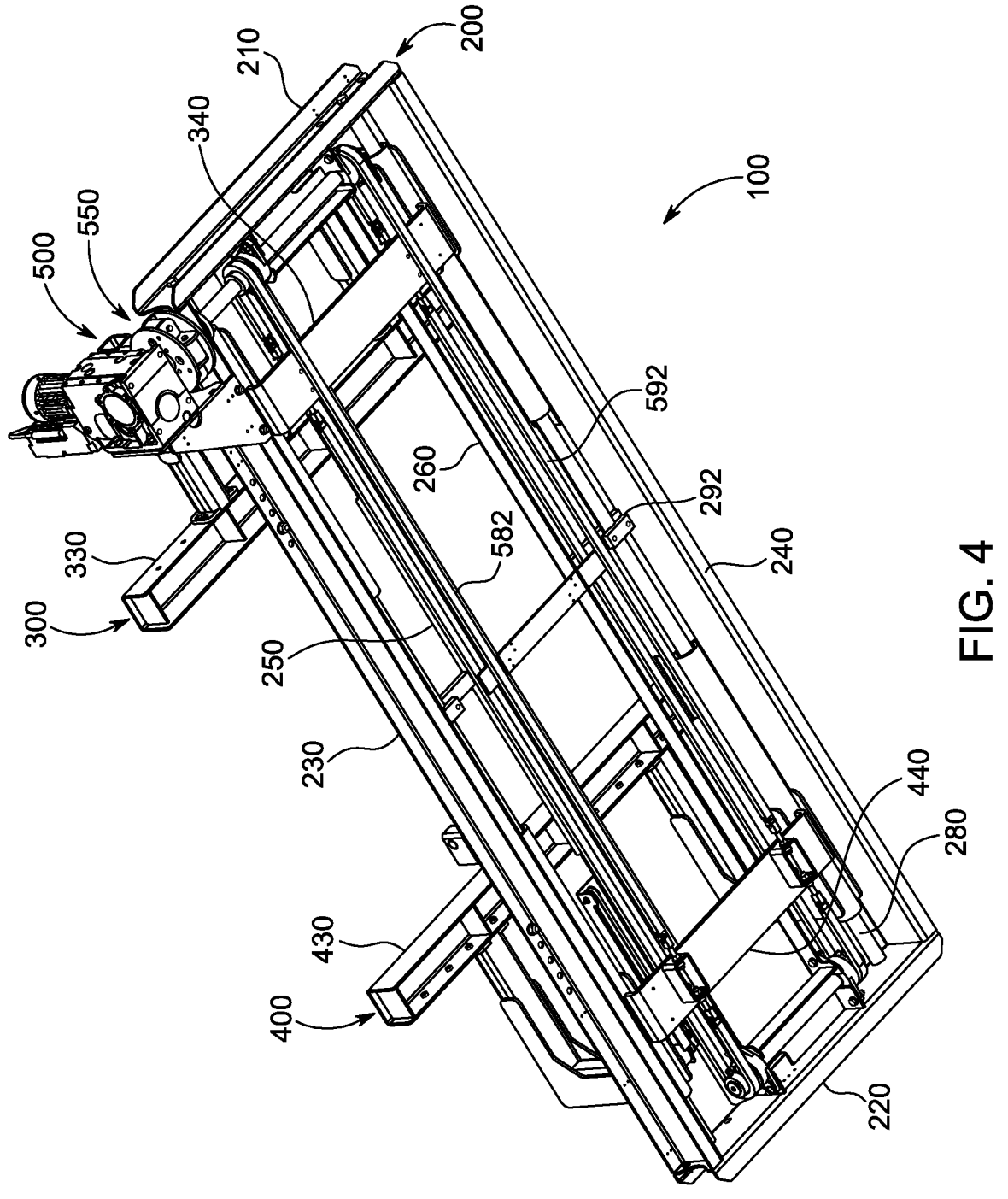
FIG. 4 is a bottom perspective view of the load-centering apparatus of FIG. 1.
Figure 5:
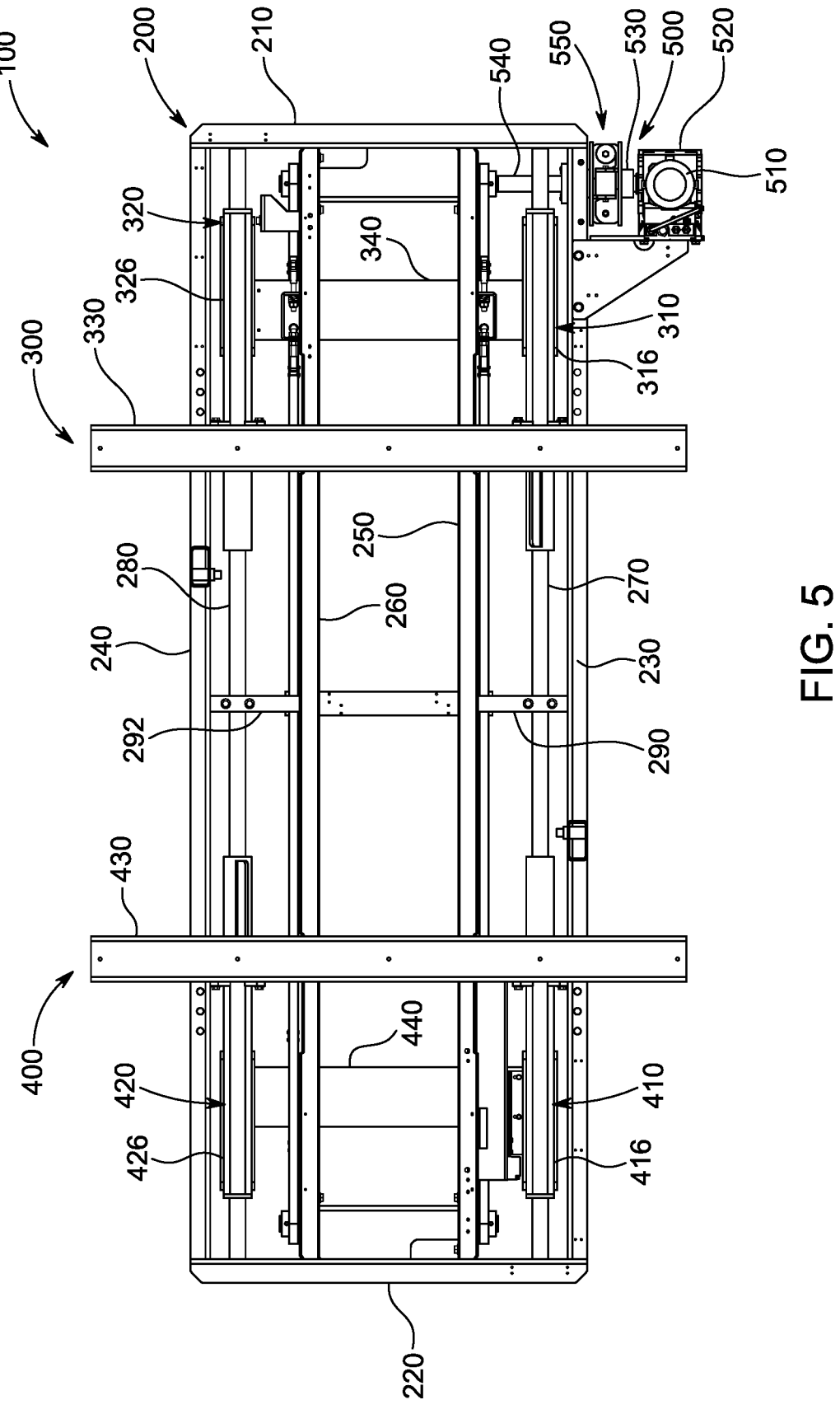
FIG. 5 is a top plan view of the load-centering apparatus of FIG. 1.
Figure 6:
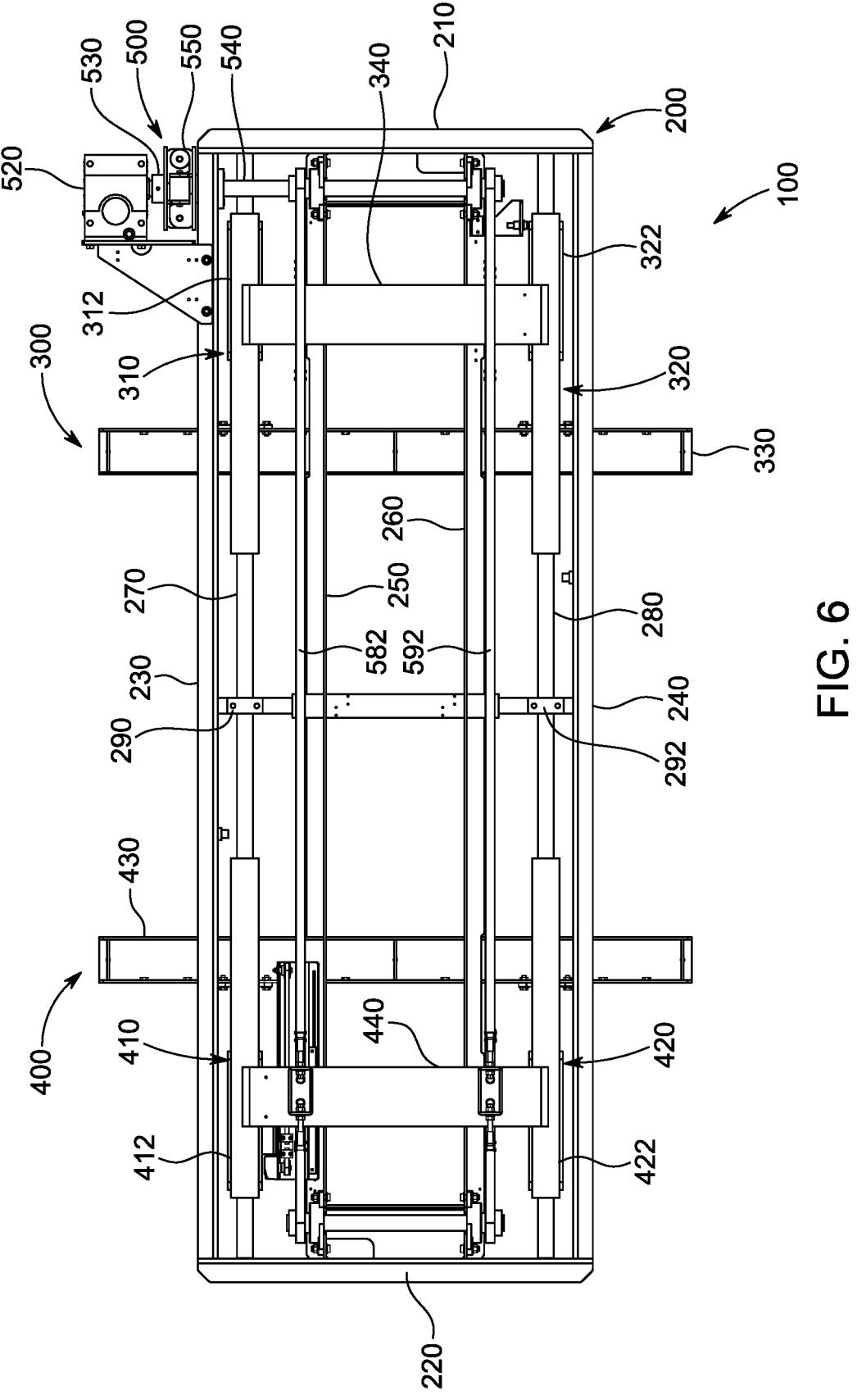
FIG. 6 is a bottom plan view of the load-centering apparatus of FIG. 1.

The stretch-hood machine 10, which is best shown in FIG. 2, is configured to wrap a load of goods with a segment of tubular plastic stretch film. The stretch-hood machine 10 includes a machine frame 12, a film-supply assembly 20 supported by the machine frame 12, a film-opening assembly 30 supported by the machine frame 12, a reefing-and-wrapping assembly 40 supported by the machine frame 12, an operator interface (not shown), and a controller (not shown).

The machine frame 12 is formed from multiple tubular and/or solid members and other elements (not individually labeled) and is configured to support the other assemblies and components of the stretch-hood machine 12. The machine frame 12 defines a wrapping area within its interior and has an infeed area (not labeled) at which a palletized load of goods (such as a load L on a pallet P) is conveyed into the wrapping area for wrapping and an outfeed area (not labeled) at which the palletized load is conveyed from the wrapping area after wrapping. The illustrated machine frame 12 is merely one example configuration, and any suitable configuration may be employed.

The film-supply assembly 20 includes suitable components configured to form a segment of tubular film F that the stretch-hood machine 10 then uses to wrap the load L. More specifically, the film-supply assembly 20 includes components suitable to draw a length of tubular film from a roll R of tubular film rotatably mounted to the machine frame 12, cut the length of tubular film from the roll R to form the segment of tubular film F, and (in certain instances) close the upper end of the segment of tubular film (such as via a heat-sealing mechanism). The controller determines the length of the segment of tubular film F based (in part) on the height of the load L.

The film-opening assembly 30 includes suitable components configured to open a bottom portion of the segment of tubular film F so it forms a generally rectangular perimeter in preparation for reefing by the reefing-and-wrapping assembly 40. More specifically, the film-opening assembly 30 includes four suction boxes (not labeled) and four corresponding holding devices (not labeled) that are movable laterally inward and outward relative to the segment of tubular film F. To open the bottom portion of the segment of tubular film F, the suction boxes move laterally inward so they are positioned adjacent the outer surface of the bottom portion of the segment of tubular film F. A vacuum is generated to draw the bottom portion of the segment of tubular film F onto the suction boxes, thereby partially opening the bottom portion. The holding devices then clamp the segment of tubular film, and the suction boxes and holding devices move laterally outward to open the bottom portion of the segment of tubular film F in preparation for reefing. At this point, the perimeter of the bottom portion of the segment of tubular film F forms a generally rectangular shape in preparation for reefing. This is merely one example of the film-opening assembly 30, and other embodiments of the film-opening assembly 30 may include any other suitable components.

The reefing-and-wrapping assembly 40 includes a wrapping carriage (not shown for clarity); a wrapping-carriage actuator (not labeled); first, second, third, and fourth reefing devices (not labeled); and first and second sets of reefing-device actuators (not labeled). The wrapping carriage includes a suitable frame and is vertically movable relative to the machine frame 12 between upper and lower positions. The wrapping-carriage actuator, which may include any suitable actuator (such as an electric or a hydraulic motor), is operably connected to the wrapping carriage to move the wrapping carriage between its upper and lower positions. The reefing devices are mounted to the frame of the wrapping carriage in a generally rectangular arrangement, and the reefing-device actuators are operably connected to the reefing devices to move them laterally inwardly and outwardly during reefing and wrapping processes. The reefing devices include reefing fingers and actuators configured to reef tubular film onto the reefing fingers and later unreef the tubular film off of the reefing fingers.

The operator interface (not shown) is configured to receive inputs from an operator and, in certain embodiments, to output information to the operator. The operator interface includes one or more input devices configured to receive inputs from the operator. In various embodiments, the one or more input devices include one or more buttons (such as hard or soft keys), one or more switches, and/or a touch panel. In various embodiments, the operator interface includes a display device configured to display information to the operator, such as information about the palletized load, the status of the wrapping operation, or the parameters of the stretch-hood machine 10. The operator interface may include other output devices instead of or in addition to the display device, such as one or more speakers and/or one or more lights. In certain embodiments, the operator interface is formed as part of the stretch-hood machine 10 and is, for instance, mounted to the machine frame 12. In other embodiments, the operator interface is remote from the stretch-hood machine 10.

The controller includes a processing device communicatively connected to a memory device. The processing device may include any suitable processing device such as, but not limited to, a general-purpose processor, a special-purpose processor, a digital-signal processor, one or more microprocessors, one or more microprocessors in association with a digital-signal processor core, one or more application-specific integrated circuits, one or more field-programmable gate array circuits, one or more integrated circuits, and/or a state machine. The memory device may include any suitable memory device such as, but not limited to, read-only memory, random-access memory, one or more digital registers, cache memory, one or more semiconductor memory devices, magnetic media such as integrated hard disks and/or removable memory, magneto-optical media, and/or optical media. The memory device stores instructions executable by the processing device to control operation of the stretch-hood machine 10 (such as to carry out the wrapping process described below). The controller is communicatively and operably connected to the film-supply assembly 20; the film-opening assembly 30; and the reefing-and-wrapping assembly 40 to control operation of these components to carry out a wrapping process. The controller is communicatively connected to the operator interface to: (1) receive signals from the operator interface that represent inputs received by the operator interface; and (2) send signals to the operator interface to cause the operator interface to output (such as to display) information. In this example embodiment, the controller is also communicatively and operably connected to the load-centering apparatus 100, and particularly the motor 510 thereof, to control operation of the load-centering apparatus 100, as further described below. In other embodiments, operation of the load-centering apparatus is controlled by a controller other than the controller of the stretch-hood machine.

Generally, to wrap a load of goods with the stretch-hood machine 10, the controller controls the film-supply assembly 20 to draw tubular film from the film roll R, cut the film to length to form the segment of tubular film F, and close the top end of the segment of tubular film F. The controller controls the film-opening assembly 30 to open the bottom portion of the segment of tubular film F. The controller controls the reefing-device actuators to move the reefing devices laterally inwardly to respective insertion positions. The controller controls the wrapping-carriage actuator to raise the wrapping carriage so the reefing fingers of the reefing devices are received in the open bottom portion of the segment of tubular film F and then controls the reefing-device actuators to move the reefing devices laterally outwardly to respective reefing positions. The controller controls the actuators of the reefing devices to reef the segment of tubular film F onto the reefing fingers. The controller then controls the reefing-device actuators to move the reefing devices laterally outwardly to respective stretching positions, thereby stretching the segment of tubular film F so its perimeter circumscribes the load of goods. The controller controls the wrapping carriage to descend while controlling the actuators of the reefing devices to unreef the segment of tubular film F from the reefing fingers. As the segment of tubular film F is unreefed, it attempts to return to its unstretched size and shape and laterally retracts onto the load, which unitizes the load and/or secures the load to a pallet.

The infeed conveyor IC is a driven conveyor positioned upstream of the stretch-hood machine 10 and configured to deliver loads of goods to the infeed area of the stretch-hood machine 10 for wrapping. The outfeed conveyor OC is a driven conveyor positioned downstream of the stretch-hood machine 10 and configured to receive loads of goods from the outfeed area of the stretch-hood machine 10 after wrapping and move them downstream of the stretch-hood machine 10. As used herein, "downstream" means the direction D (FIG. 1) and "upstream means the direction opposite the direction D.

The load-centering apparatus 100, best shown in FIGS. 3-8, is configured to center loads of goods on the infeed conveyor IC before the infeed conveyor IC delivers the loads to the infeed area of the stretch-hood machine 10. The load-centering apparatus 100 includes a frame 200, a first load-engagement-arm assembly 300, a second load-engagement-arm assembly 400, a drive assembly 500, and a sensor (not shown).

The frame 200, which is best shown in FIGS. 3-6, is configured to support the first load-engagement-arm assembly 300, the second load-engagement-arm assembly 400, and the drive assembly 500. The frame 200 includes a first end member 210, a second end member 220, a first side member 230, a second side member 240, a first center member 250, a second center member 260, spaced-apart first and second arm-assembly-support rods 270 and 280, and a plurality of rod supports including rod supports 290 and 292. The first and second arm-assembly-support rods 270 and 280 are connected to and extend between the first end member 210 and the second end member 220 and are configured to support the first load-engagement-arm assembly 300 and the second load-engagement-arm assembly 400 as those assemblies move back and forth along the first and second arm-assembly-support rods 270 and 280 (as described below). These members 210, 220, 230, 240, 250, and 260; these rods 270 and 280; and these rod supports 290 and 292 are made of any suitable materials (such as metal) and attached to one another in any suitable manner (such as by welding and/or fasteners). The frame 200 can be alternatively configured in other embodiments.

The first load-engagement-arm assembly 300, which is best shown in FIGS. 3-6, is driven by the drive assembly 500, movably mounted on the frame 200, and configured to engage a first side of a load L to (along with the second load-engagement-arm assembly 400) center the load L on the infeed conveyor IC. The first load-engagement-arm assembly 300 includes a first support arm 310, a second support arm 320, a load engager 330, and a connector 340. The support arms 310 and 320 are identical in this embodiment but may vary in other embodiments. The first support arm 310 includes a rod-receiving mount 312, an upwardly extending member 314 connected to the rod-receiving mount 312, and an inwardly extending member 316 connected to the upwardly extending member 314. Likewise, the second support arm 320 includes a rod-receiving mount 322, an upwardly extending member 324 connected to the rod-receiving mount 322, and an inwardly extending member 326 connected to the upwardly extending member 324. The rod-receiving mount 312 is slidably mounted on and supported by the support rod 270. The rod-receiving mount 322 is slidably mounted on and supported by the support rod 280. Thus, support rods 270 and 280 support the first load-engagement-arm assembly 300. The load engager 330 is connected to the inner ends of the support arms 310 and 320 (and, more specifically, connected to the inner ends of inwardly extending members 316 and 326 of the support arms 310 and 320) and extends transversely to the support arms 310 and 320. The connector 340 is connected to the rod-receiving mount 312, the rod-receiving mount 322, and the respective bottom runs (not separately labeled) of the belts 582 and 592 of the drive assembly 500 so the drive assembly 500 can drive the first load-engagement-arm assembly 300 (as described below).

The second load-engagement-arm assembly 400 is generally a mirror image of the first load-engagement-arm assembly 300, except for the connector 440. More specifically, the second load-engagement-arm assembly 400, which is best shown in FIGS. 3-6, is driven by the drive assembly 500, movably mounted on the frame 200, and configured to engage a second side of a load L to (along with the first load-engagement-arm assembly 300) center the load L on the infeed conveyor IC. The second load-engagement-arm assembly 400 includes a first support arm 410, a second support arm 420, a load engager 430, and a connector 440. The support arms 410 and 420 are identical in this embodiment but may vary in other embodiments. The first support arm 410 includes a rod-receiving mount 412, an upwardly extending member 414 connected to the rod-receiving mount 412, and an inwardly extending member 416 connected to the upwardly extending member 414. Likewise, the second support arm 420 includes a rod-receiving mount 422, an upwardly extending member 424 connected to the rod-receiving mount 422, and an inwardly extending member 426 connected to the upwardly extending member 424. The rod-receiving mount 412 is slidably mounted on and supported by the support rod 270. The rod-receiving mount 422 is slidably mounted on and supported by the support rod 280. Thus, support rods 270 and 280 support the second load-engagement-arm assembly 400. The load engager 430 is connected to the inner ends of the support arms 410 and 420 (and, more specifically, connected to the inner ends of inwardly extending members 416 and 426 of the support arms 410 and 420) and extends transversely to the support arms 410 and 420. The connector 440 of the second load-engagement-arm assembly 400 is connected to the respective top runs (not separately labeled) of the belts 582 and 592 of the drive assembly 500 such that rotation of the belts 582 and 592 in the first direction (clockwise when viewed from the motor side) causes the inward movement of the second load-engagement-arm assembly 400 and such that rotation of the belts 582 and 592 in the opposite second direction (counter-clockwise when viewed from the motor side) causes the outward movement of the second load-engagement-arm assembly 400.

Figure 7:
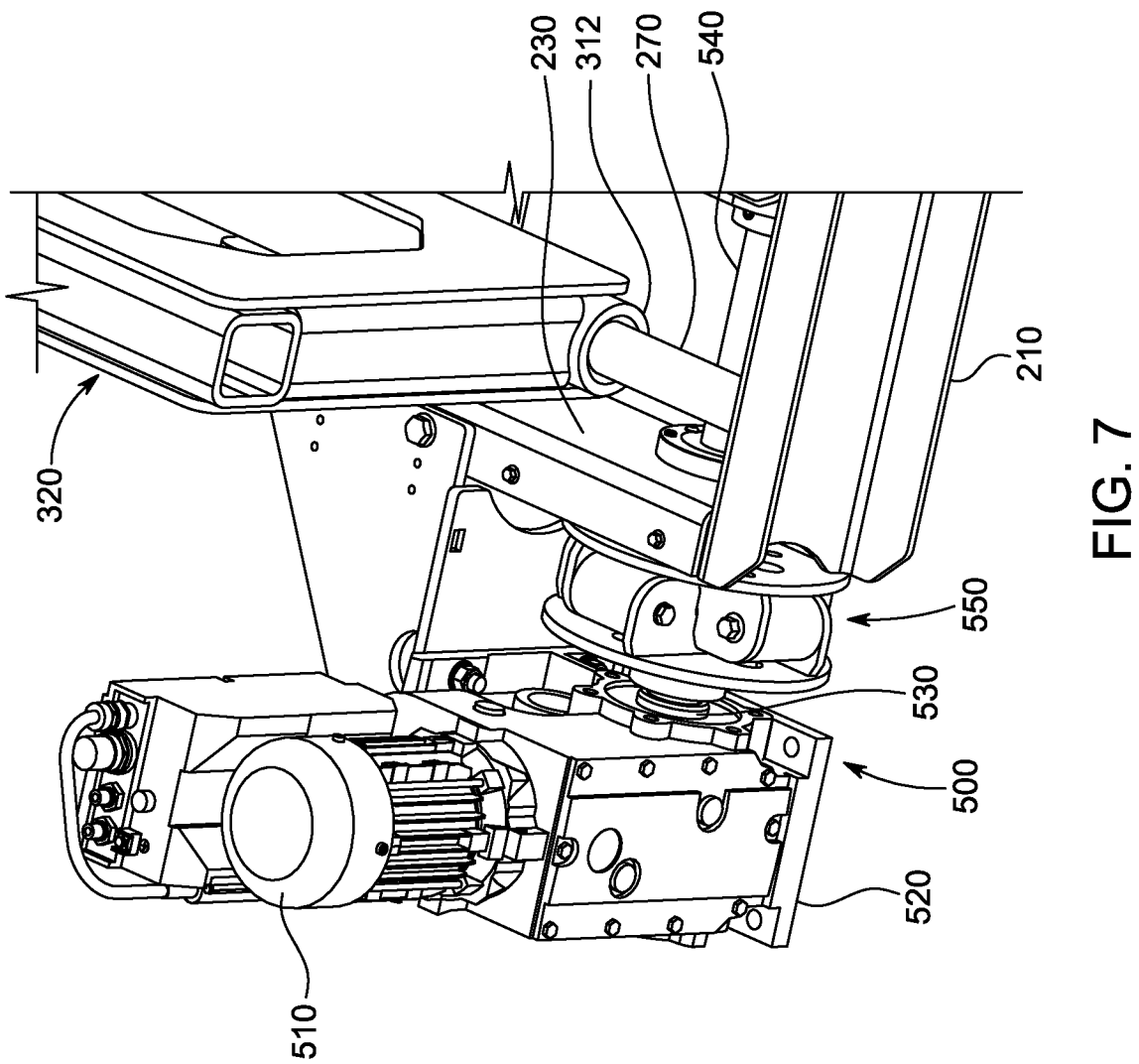
FIG. 7 is an fragmentary perspective view of certain parts of the drive assembly of the load-centering apparatus of FIG. 1.
Figure 8:
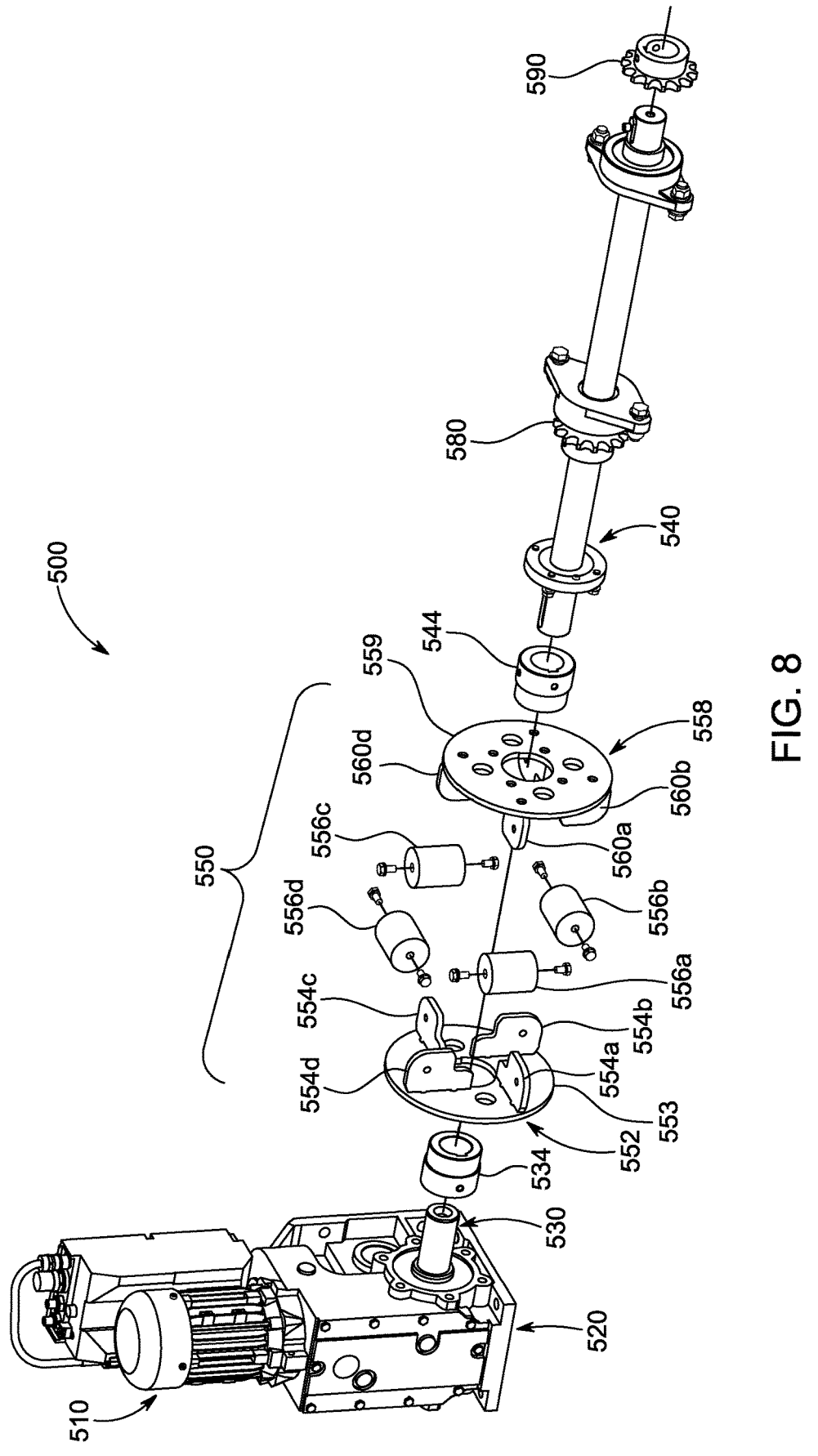
FIG. 8 is an exploded perspective view of certain parts of the drive assembly of the load-centering apparatus of FIG. 1.

The drive assembly 500, which is best shown in FIGS. 7 and 8, is operably connected to the first and second load-engagement-arm assemblies 300 and 400 to move them toward one another to center a load of goods on the infeed conveyor IC. The drive assembly 500 includes a motor 510, a motor support 520, a first drive shaft 530, a second drive shaft 540, a torque-absorbing coupler 550, a first drive gear 580, a second drive gear 590, a first belt 582, and a second belt 592.

As best shown in FIG. 8, the torque-absorbing coupler 550 includes a first torque-absorber holder 552; a second torque-absorber holder 558; and four separate independently but simultaneously compressible torque absorbers 556a, 556b, 556c, and 556d attached to the first and second torque-absorber holders 552 and 558. The first torque-absorber holder 552 includes a first disc-shaped base 553 and first brackets 554a, 554b, 554c, and 554d connected to and extending transversely from the first base 553. Likewise, the second torque-absorber holder 558 includes a second disc-shaped base 559 and second brackets 560a, 560b, 560c, and 560d connected to and extending transversely from the second base 559.

The torque absorbers 556a, 556b, 556c, and 556d are respectively attached to the first brackets 554a, 554b, 554c, and 554d and the second brackets 560a, 560b, 560c, and 560d by suitable fasteners (not labeled). Specifically: (1) torque absorber 556a is attached to and extends between bracket 554a and bracket 560a; (2) torque absorber 556b is attached to and extends between bracket 554b and bracket 560b; (3) torque absorber 556c is attached to and extends between bracket 554c and bracket 560c; and (4) torque absorber 556d is attached to and extends between bracket 554d and bracket 560d. The torque absorbers 556a, 556b, 556c, and 556d are longitudinally compressible members. In this example embodiment, the torque absorbers are compressible rubber cylinders, though they may be any other suitable components (such as springs) in other embodiments. Each of the torque absorbers 556a, 556b, 556c, and 556d defines a central longitudinally extending bore (not labeled) sized to receive the respective fastener (not labeled). Each of the torque absorbers 556a, 556b, 556c, and 556d extends along an axis that is transverse to the rotational axes of the first drive shaft 530 and the second drive shaft 540.

The motor 510, which is an electric motor in this example embodiment but may be any other suitable motor, is suitably supported by the motor support 520. The motor 510 is operably connected to the first drive shaft 530 (such as via suitable gearing) and configured to rotate the first drive shaft 530. The coupling 534 connects the first drive shaft 530 to the to the first torque-absorber holder 552 of the torque-absorbing coupler 550 such that the first drive shaft 530, the coupling 534, and the first torque-absorber holder 552 rotate together. The coupling 544 connects the second drive shaft 540 to the second torque-absorber holder 558 of the torque-absorbing coupler 550 such that the second torque-absorber holder 558, the coupling 544, and the second drive shaft 540 rotate together. The first drive gear 580 is fixedly connected to the second drive shaft 540 such that rotation of the second drive shaft 540 causes rotation of the first drive gear 580. Likewise, the second drive gear 590 is fixedly connected to the second drive shaft 540 such that rotation of the second drive shaft 540 causes rotation of the second drive gear 590.

The first belt 582 extends around the first drive gear 580 and a freely rotatable gear, pulley, or other suitable component (not labeled) supported by the frame 200 adjacent the second load-engagement-arm assembly 400 and is driven by the first drive gear 580. Similarly, the second belt 592 extends around the second drive gear 590 and a freely rotatable gear, pulley, or other suitable component (not labeled) supported by the frame 200 adjacent the second load-engagement arm assembly 400 and is driven by the second drive gear 590. As explained above, the connector 340 of the first load-engagement-arm assembly 300 is connected to the bottom runs of the belts 582 and 592, and the connector 440 of the second load-engagement-arm assembly 400 is connected to the top runs of the belts 582 and 592. This configuration results in the first second load-engagement-arm assemblies moving: (1) toward one another at the same rate when the second drive shaft 540 (and therefore the drive gears 580 and 590 and the belts 582 and 592) rotates in a first rotational direction (here, clockwise from the perspective shown in FIG. 3); and (2) away from one another at the same rate when the second drive shaft 540 (and therefore the drive gears 580 and 590 and the belts 582 and 592) rotates in a second opposite rotational direction (here, counter-clockwise from the perspective shown in FIG. 3).

Although not shown, the sensor is configured to detect movement (or lack thereof) of one or more of the first load-engagement-arm assembly 300, the second load-engagement arm assembly 400, and the second drive shaft 540 and to send the appropriate feedback to the controller. The sensor may be any suitable sensor configured to detect movement, such as (but not limited to) an encoder, an optical sensor, an ultrasonic sensor, or a laser sensor. The load-centering assembly may include any suitable quantity of sensors.

In operation, generally, when a load of goods on the infeed conveyor IC is positioned between the first and second load-engagement-arm assemblies 300 and 400, the drive assembly 500 moves the assemblies laterally inward until they engage the load of goods and center it on the infeed conveyor. Once the load of goods is centered, the load-engagement assemblies 300 and 400 stop moving because they are squeezing the load of goods from both sides. The sensor detects that the load-engagement assemblies have stopped moving (or have slowed so their speed has fallen below a preset threshold speed) and sends a corresponding signal to the controller. The drive assembly then move the arms laterally outward to release the (now centered) load of goods for delivery to the stretch-hood machine.

Figures 9A, 9B, 9C:
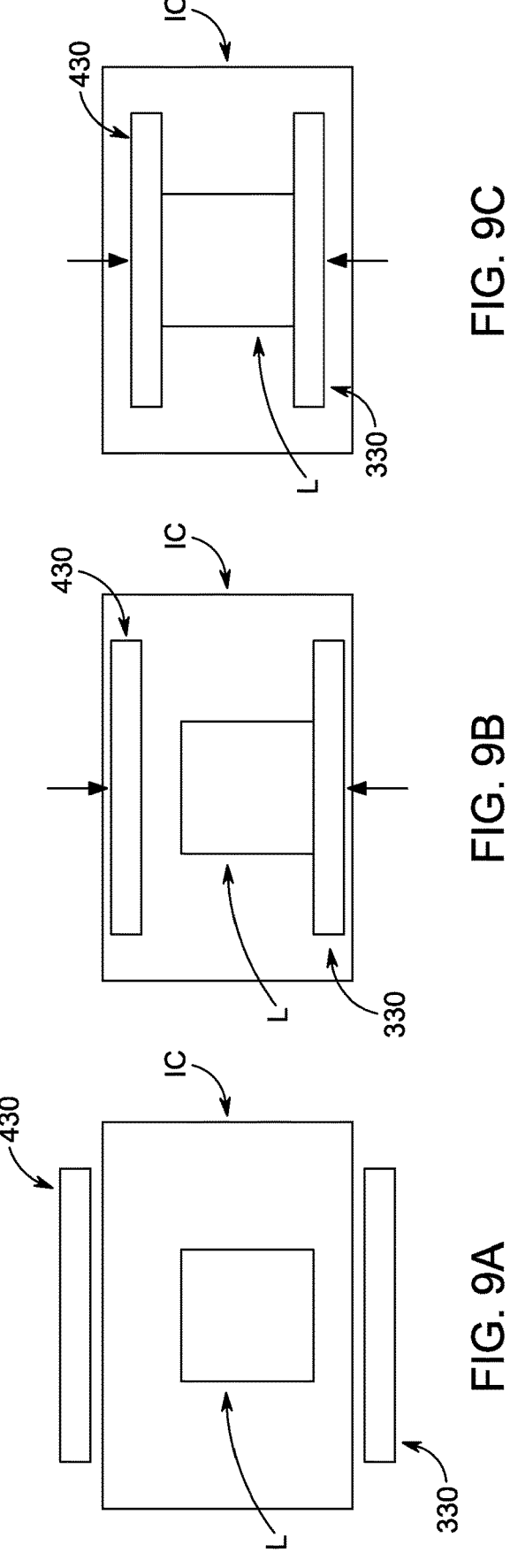
FIGS. 9A-9C are simplified top plan views showing a load of goods on the infeed conveyor of FIG. 1 and the centering arms of the load-centering apparatus of FIG. 1 centering the load of goods on the infeed conveyor.

FIGS. 9A-9C show the load-centering assembly 100 centering a load of goods L on the infeed conveyor IC. Initially, as shown in FIG. 9A, the load engagers 330 and 430 of the first and second load-engagement-arm assemblies 300 and 400 are in respective home positions and the load L is not centered on the infeed conveyor IC. As shown in FIG. 9B, the motor 510 begins driving the belts 582 and 592 (via the first drive shaft 530, the torque-absorbing coupler 550, and the second drive shaft 540) in a first rotational direction, which causes the load engagers 330 and 430 to begin moving toward one another and toward the load of goods L. Eventually, the load engager 330 contacts the load of goods L and being moving it toward the load engager 430 and the center of the infeed conveyor IC. As shown in FIG. 9C, eventually the load engager 330 moves the load of goods L into contact with the load engager 430, thereby centering the load of goods L on the infeed conveyor IC. At this point the sensor detects (either via direct detection of one or both of the load engagers 330 and 430 or via indirect detection of the second drive shaft 540) that the load engagers are no longer moving, and the motor 510 begins driving the belts 582 and 592 in the second rotational direction, which causes the load engagers 330 and 430 to move away from one another and back toward their home positions.

The torque-absorbing coupler 550 is configured to absorb some of the torque the motor 510 applies to the first drive shaft 530 after the load engagers 330 and 430 contact and center the load of goods L on the infeed conveyor IC to minimize the likelihood that the load engagers 330 and 430 will damage the load of goods L after centering the load of goods L and before releasing the load of goods L.

As explained above, the plate 553 and the brackets 556a-556d of the first torque-absorber holder 552 of the torque-absorbing coupler 550 rotate with the first drive shaft 530, and the brackets 556a-556d impart a drive torque on the torque absorbers 556a-556d of the torque-absorbing coupler 550. The torque absorbers 556a-556d transmit this drive torque to the brackets 560a-560d, the plate 560, and the second drive shaft 540. The torque absorbers 556a-556d are compressible and have a stiffness such that: (1) when the motor 510 is driving the first drive shaft 530 and a resistive force imparted on the first and second load-engagement-arm assemblies 300 and 400 is below a threshold resistive force, the torque absorbers 556a-556d do not compress; and (2) when the motor 510 is driving the first drive shaft 530 and the resistive force imparted on the first and second load-engagement-arm assemblies 300 and 400 reaches the threshold resistive force, the brackets 556a-556d compress the torque absorbers 556a-556d against the brackets 560a-560d, thereby absorbing the excess torque without transmitting the entire drive torque (including that excess torque) to the second drive shaft 540.

Accordingly, when neither of the engagers 330 and 430 of the first and second load-engagement-arm assemblies 300 and 400 engage the load L, as shown in FIG. 9A, the resistive force against the engagers 330 and 340 is negligible (limited to the weight of the components and the friction between the components) and less than the threshold resistive force. In this scenario, the torque-absorbing members 556a-556d transmit the drive torque of the first drive shaft 530 to the second torque-absorber holder 558 without compressing. This causes rotation of the second torque-absorber holder 558, the second drive shaft 540, the drive gears 580 and 590, and the drive belts 582 and 592, which causes inward movement of the first and second load-engagement arm assemblies 300 and 400 (and thus inward movement of the engagers 330 and 430 of the first and second load-engagement arm assemblies 300 and 400).

When one (but not both) of the engagers 330 and 430 of the first and second load-engagement-arm assemblies 300 and 400 engages the load L but the load L is not yet centered, as shown in FIG. 9B, the resistive force against the engagers 330 and 430 is still below the threshold resistive force. In this scenario, the torque-absorbing members 556s-556d still transmit the drive torque of the first drive shaft 530 to the second torque-absorber holder 558 without compressing. This causes rotation of the second torque-absorber holder 558, the second drive shaft 540, the drive gears 580 and 590, and the drive belts 582 and 592, which causes further inward movement of the first and second load-engagement arm assemblies 300 and 400 (and thus further inward movement of the engagers 330 and 430 of the first and second load-engagement arm assemblies 300 and 400).

Once both of the engagers 330 and 430 of the first and second load-engagement-arm assemblies 300 and 400 arm assemblies have engaged and centered the load L, as shown in FIG. 9C, the resistive force against the engagers 330 and 430 rapidly increases until reaching or exceeding the threshold resistive force. Once the resistive force reaches the threshold resistive force, rotation of the first drive shaft 530 does not continue to cause rotation of the second drive shaft

540, but rather causes the first torque-absorber holder 552 to simultaneously compress the torque absorbers 556a-556d against the second torque-absorber holder 558. During compression, the torque absorbers absorb the excess torque applied by the first drive shaft 530 and do not transmit that excess torque to the second drive shaft 540. If the motor 510 continues driving the first drive shaft 530 once the torque absorbers have been fully compressed, the full drive torque of the first drive shaft 530 is again transmitted to the second drive shaft 540 via the torque-absorbing coupler 550

As explained above, in operation, the motor 510 moves the first and second load-engagement-arm assemblies 300 and 400 inward until the sensor detects that the arm assemblies have stopped moving, at which point the motor 510 starts moving the load-engagement-arm assemblies in the opposite direction. There is a time delay between the point in time at which the sensor detects that the first and second load-engagement-arm assemblies 300 and 400 have stopped and the point in time at which the motor 510 reverses the first and second load-engagement-arm assemblies 300 and 400. During this delay, the motor 510 continues attempting to move the first and second load-engagement-arm assemblies 300 and 400 inward. It's during this delay that the torque-absorbing coupler 550 absorbs the excess torque the motor applies to the first drive shaft 530, which prevents the first and second load-engagement-arm assemblies 300 and 400 from applying a high squeezing force to the load L and damaging the load L during this short delay.

The torque-absorbing coupler can alternatively include: (a) a different quantity of torque absorbers, torque absorber holders, brackets, and/or plates; (b) differently configured and/or sized torque absorbers, torque absorber holders, brackets, and/or plates; and/or (c) differently positioned torque absorbers, torque absorber holders, brackets, and/or plates, or be other suitably configured.

The invention claimed is:

1. A load-centering apparatus comprising:
   a frame;
   a first load-engagement-arm assembly supported by the frame and comprising a first load engager;
   a second load-engagement-arm assembly supported by the frame and comprising a second load engager; and
   a drive assembly operably connected to the first and second load-engagement arm assemblies and configured to move the first and second load engagers toward one another, the drive assembly comprising:
   a first drive shaft;
   a second drive shaft;
   a torque-absorbing coupler coupling the second drive shaft to the first drive shaft and comprising a compressible torque absorber, wherein the compressible torque absorber has a stiffness such that the compressible torque absorber compresses when a resistive force applied to at least one of the first and second load engagers reaches a threshold resistive force; and
   a motor operably connected to the first drive shaft to apply a drive torque to the first drive shaft.

2. The load-centering apparatus of claim 1, wherein the torque-absorbing coupler comprises a multiple compressible torque absorbers that each have the stiffness such that they each compress when the resistive force applied to the at least one of the first and second load engagers reaches the threshold resistive force.

3. The load-centering apparatus of claim 1, wherein the torque-absorbing coupler includes a first torque-absorber holder, a second torque-absorber holder, and multiple compressible torque absorbers attached to the first torque absorber holder and the second torque absorber holder, wherein the compressible torque absorbers each have the stiffness such that they each compress when the resistive force applied to the at least one of the first and second load engagers reaches the threshold resistive force.

4. The load-centering apparatus of claim 3, wherein the first torque-absorber holder is fixed in rotation with the first drive shaft and the second torque-absorber holder is fixed in rotation relative to the second drive shaft.

5. The load-centering apparatus of claim 4, wherein the first torque-absorber holder rotates relative to the second torque-absorber holder when the torque absorbers compress.

6. The load-centering apparatus of claim 5, wherein the first torque-absorber holder includes a first base and a plurality of first brackets connected to the first base, and wherein the second torque-absorber holder includes a second base and a plurality of second brackets connected to the second base.

7. The load-centering apparatus of claim 6, wherein each torque absorber is attached to and extends between a different pair of the first and second brackets.

8. The load-centering apparatus of claim 6, wherein each of the torque absorbers comprises a compressible rubber member.

9. The load-centering apparatus of claim 6, wherein each of the torque absorbers extends along an axis that is transverse to rotational axes of the first drive shaft and the second drive shaft.

10. The load-centering apparatus of claim 1, further comprising a sensor configured sense movement of a movable component of the load-centering apparatus, the movable component comprising at least one of: the first load engager, the second load engager, and the second drive shaft.

11. The load-centering apparatus of claim 10, further comprising a controller configured to, after the sensor senses that movement of the movable component has stopped, stop the motor from moving the first and second load engagers toward one another.

12. A method for centering a load on a conveyor, the method comprising:

moving, via a motor, first and second load engagers toward the load, wherein the first load engager is on a first side of the load and the second load engager is on a second side of the load;

engaging the load with the first and second load engagers to center the load on the conveyor;

detecting, via a sensor, that a movement speed of at least one of the first and second load engagers has reached a threshold movement speed;

responsive to detecting that the movement speed of the at least one of the first and second load engagers has reached the threshold movement speed, moving, via the motor, the first and second load engagers away from the load to release the load; and after the first and second load engagers engage the load and before moving the first and second load engagers away from the load, absorbing, via a compressible torque absorber of a torque-absorbing coupling, at least part of a drive torque applied by the motor to a drive shaft operably connected to the first and second load engagers by the torque-absorbing coupling, wherein compressible torque absorber has a stiffness such that the compressible torque absorber compresses when a resistive force applied to at least one of the first and second load engagers reaches a threshold resistive force.

13. The method of claim 12, further comprising moving the first and second load engagers toward the load by applying, via the motor, the drive torque to the drive shaft.

14. The method of claim 12, wherein the first and second load engagers have reached the threshold movement speed when the first and second load engagers have stopped moving after engaging the load.

15. A load-centering apparatus comprising:

a frame;

a first load-engagement-arm assembly supported by the frame and comprising a first load engager;

a second load-engagement-arm assembly supported by the frame and comprising a second load engager; and a drive assembly operably connected to the first and second load-engagement arm assemblies and configured to move the first and second load engagers toward one another, the drive assembly comprising:

a first drive shaft;

a second drive shaft;

a torque-absorbing coupler coupling the second drive shaft to the first drive shaft and comprising a first torque-absorber holder fixed in rotation with the first drive shaft, a second torque-absorber holder fixed in rotation relative to the second drive shaft, and multiple compressible torque absorbers attached to the first torque absorber holder and the second torque absorber holder, wherein the compressible torque absorbers each have a stiffness such that they each compress when a resistive force applied to at least one of the first and second load engagers reaches a threshold resistive force; and a motor operably connected to the first drive shaft to apply a drive torque to the first drive shaft.

16. The load-centering apparatus of claim 15, wherein the first torque-absorber holder rotates relative to the second torque-absorber holder when the torque absorbers compress.

17. The load-centering apparatus of claim 16, wherein the first torque-absorber holder includes a first base and a plurality of first brackets connected to the first base, and wherein the second torque-absorber holder includes a second base and a plurality of second brackets connected to the second base.

18. The load-centering apparatus of claim 17, wherein each torque absorber is attached to and extends between a different pair of the first and second brackets.

19. The load-centering apparatus of claim 17, wherein each of the torque absorbers comprises a compressible rubber member.

20. The load-centering apparatus of claim 17, wherein each of the torque absorbers extends along an axis that is transverse to rotational axes of the first drive shaft and the second drive shaft.

* * * * *